United States Patent
Hong et al.

(10) Patent No.: US 10,629,961 B2
(45) Date of Patent: Apr. 21, 2020

(54) CELL BALANCING SYSTEM AND CONTROL METHOD

(71) Applicant: LG CHEM, LTD., Seoul (KR)

(72) Inventors: Sung Ju Hong, Cheongju-Si (KR); Ho Chol Nam, Cheongju-Si (KR); Hak In Kim, Cheongju-Si (KR); Seog Jin Yoon, Cheongju-Si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/076,445

(22) PCT Filed: Oct. 17, 2017

(86) PCT No.: PCT/KR2017/011448
§ 371 (c)(1),
(2) Date: Aug. 8, 2018

(87) PCT Pub. No.: WO2018/074809
PCT Pub. Date: Apr. 26, 2018

(65) Prior Publication Data
US 2019/0044194 A1 Feb. 7, 2019

(30) Foreign Application Priority Data

Oct. 21, 2016 (KR) .......................... 10-2016-0137838

(51) Int. Cl.
*H02J 7/00* (2006.01)
*H01M 10/44* (2006.01)
(Continued)

(52) U.S. Cl.
CPC ....... *H01M 10/44* (2013.01); *H01M 10/4207* (2013.01); *H02J 7/0014* (2013.01);
(Continued)

(58) Field of Classification Search
CPC .................................................. H01M 10/44
(Continued)

(56) References Cited

U.S. PATENT DOCUMENTS

| 5,528,122 A * | 6/1996 | Sullivan | H02J 7/0018 |
| | | | 320/118 |
| 6,208,117 B1 * | 3/2001 | Hibi | H02J 7/0021 |
| | | | 320/134 |

(Continued)

FOREIGN PATENT DOCUMENTS

| CN | 103036290 A | 4/2013 |
| CN | 202997622 U | 6/2013 |

(Continued)

OTHER PUBLICATIONS

International Search Report (PCT/ISA/210) issued in PCT/KR2017/011448, dated Jan. 25, 2018.
(Continued)

*Primary Examiner* — Yalkew Fantu
(74) *Attorney, Agent, or Firm* — Birch, Stewart, Kolasch & Birch, LLP

(57) ABSTRACT

The present invention relates to a cell balancing system and method, and more particularly, to a cell balancing system and method capable of supplying a charging voltage through two separately configured charging voltage sources and stably performing cell balancing by supplying a proper charging voltage to a corresponding cell through an individually configured switch in each cell, when the cell balancing is necessary.

11 Claims, 2 Drawing Sheets

(51) Int. Cl.
*H02J 7/02* (2016.01)
*H01M 10/42* (2006.01)

(52) U.S. Cl.
CPC ........ *H02J 7/0019* (2013.01); *H02J 7/00041* (2020.01); *H02J 7/02* (2013.01); *H01M 2010/4271* (2013.01); *H02J 7/0021* (2013.01); *H02J 2207/10* (2020.01); *H02J 2207/40* (2020.01)

(58) Field of Classification Search
USPC ........................................................ 320/134
See application file for complete search history.

(56) References Cited

U.S. PATENT DOCUMENTS

| | | | | |
|---|---|---|---|---|
| 6,867,567 | B2* | 3/2005 | Yokota | H02J 7/0047 320/134 |
| 8,350,528 | B2 | 1/2013 | Yang et al. | |
| 2004/0135544 | A1* | 7/2004 | King | B60L 58/22 320/116 |
| 2004/0135546 | A1* | 7/2004 | Chertok | H01M 10/441 320/118 |
| 2008/0218127 | A1 | 9/2008 | Kao et al. | |
| 2010/0019724 | A1 | 1/2010 | Mizutani et al. | |
| 2010/0194339 | A1* | 8/2010 | Yang | H02J 7/0016 320/116 |
| 2012/0161707 | A1 | 6/2012 | Kim | |
| 2013/0141047 | A1 | 6/2013 | Huang et al. | |
| 2017/0279283 | A1 | 9/2017 | Kim et al. | |

FOREIGN PATENT DOCUMENTS

| | | |
|---|---|---|
| JP | 2001-8373 A | 1/2001 |
| JP | 2002-281686 A | 9/2002 |
| JP | 2006-320044 A | 11/2006 |
| JP | 2009-247195 A | 10/2009 |
| JP | 2010-29050 A | 2/2010 |
| JP | 2010-183831 A | 8/2010 |
| JP | 2015-171310 A | 9/2015 |
| KR | 10-2009-0092890 A | 9/2009 |
| KR | 10-0969589 B1 | 7/2010 |
| KR | 10-2011-0117992 A | 10/2011 |
| KR | 10-2014-0034089 A | 3/2014 |
| KR | 10-2014-0072433 A | 6/2014 |
| KR | 10-1572178 B1 | 11/2015 |
| KR | 10-1667913 B1 | 10/2016 |
| WO | WO 2013/035963 A1 | 3/2013 |

OTHER PUBLICATIONS

European Search Report for Appl. No. 17862547.1 dated Feb. 12, 2019

* cited by examiner

【Fig. 1】
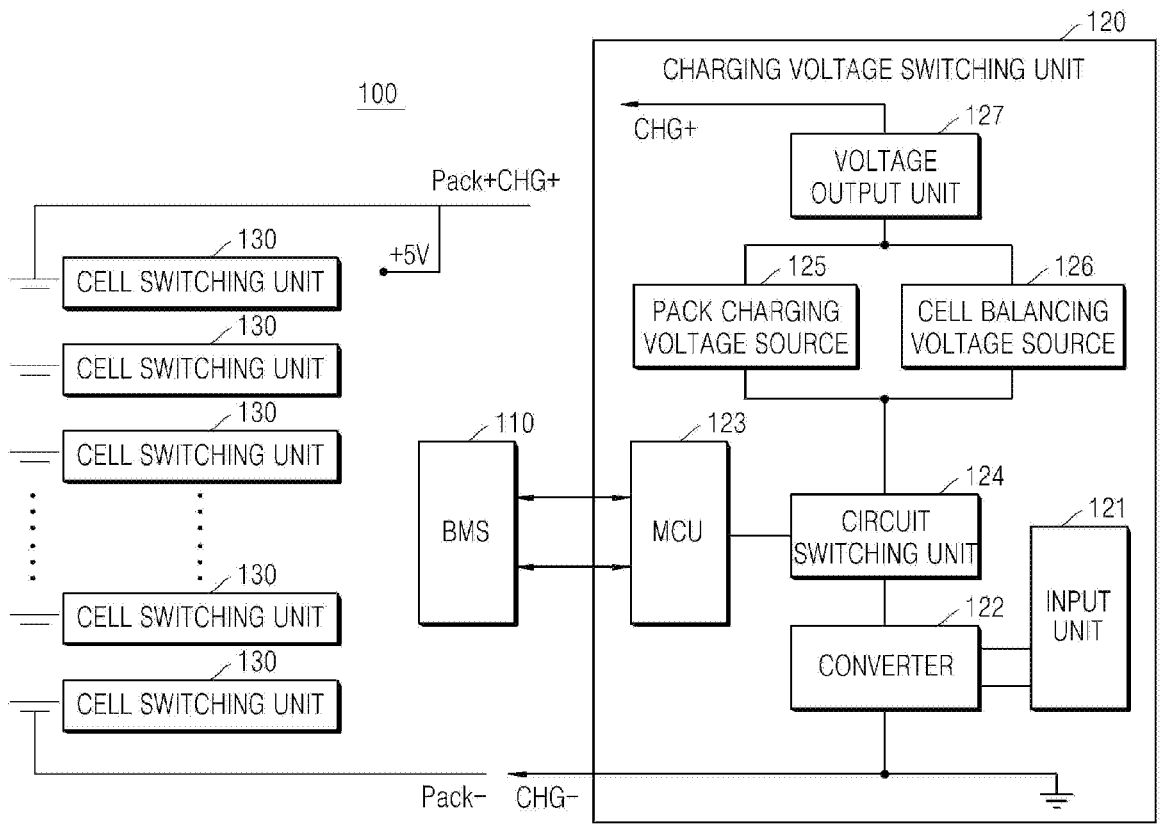
【Fig. 2】
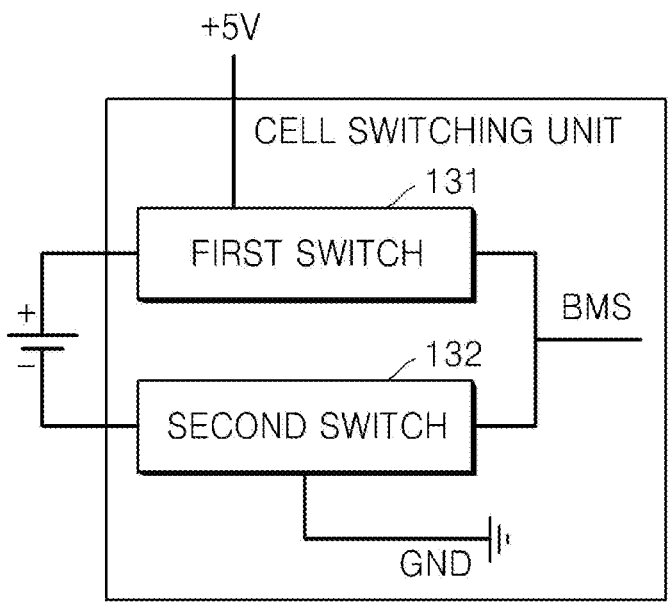

[Fig. 3]
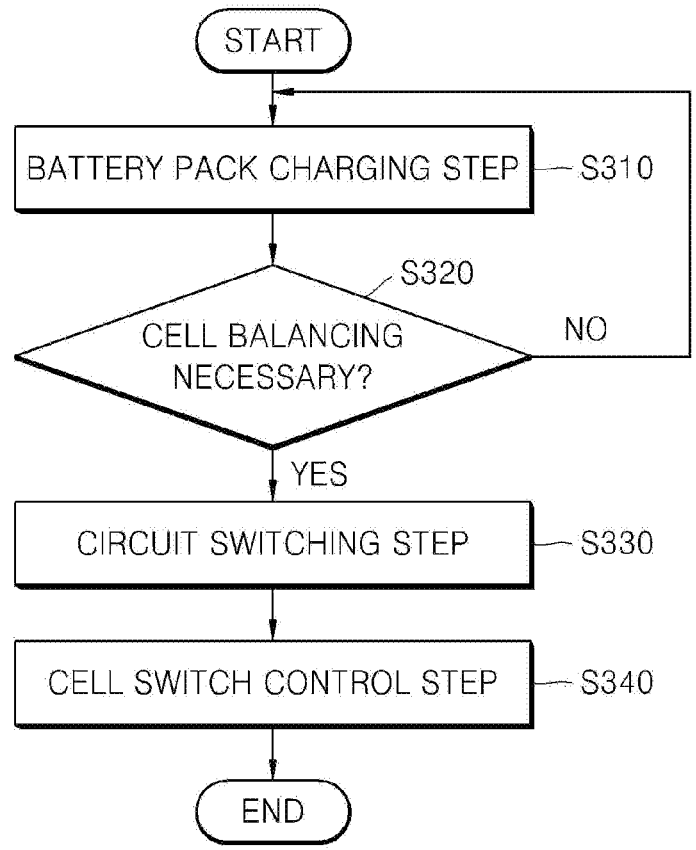
[Fig. 4]
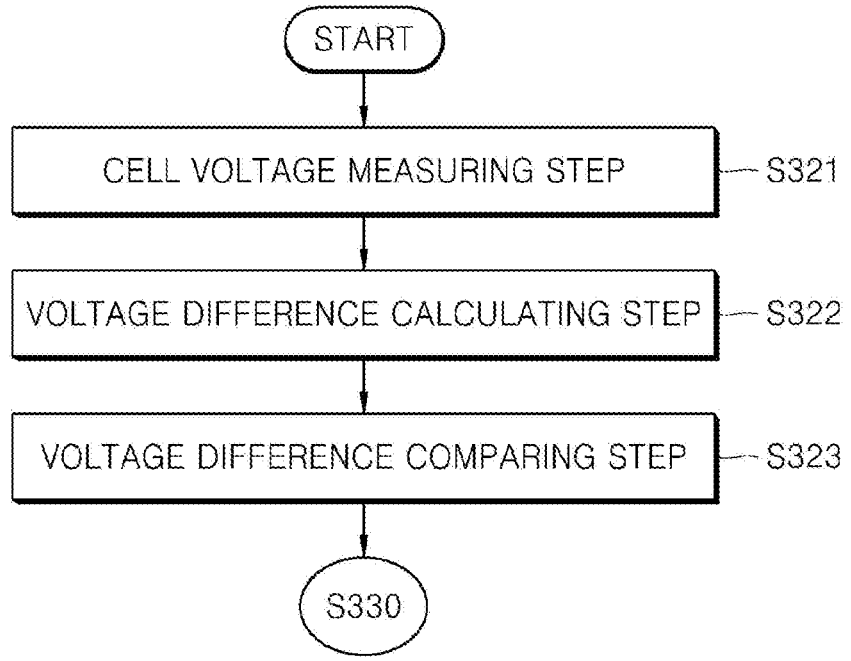

US 10,629,961 B2

CELL BALANCING SYSTEM AND CONTROL METHOD

TECHNICAL FIELD

The present invention relates to a cell balancing system and method, and more particularly, to a cell balancing system and method capable of supplying a charging voltage through two separately configured charging voltage sources and stably performing cell balancing by supplying a proper charging voltage to a corresponding cell through an individually configured switch in each cell, when the cell balancing is necessary.

BACKGROUND ART

A battery such as a lithium ion cell is used as a power source for various electronic devices. Typically, a battery (pack) is configured from a plurality of unit cells, and for the plurality of cells, charging voltages thereof become differed due to an individual difference in dynamic state caused by a Coulombic efficiency and capacity, as operation time passes.

This may cause a total discharge capability of the battery to be permanently limited, when at least one cell has a very lower charging voltage than other cells.

In addition, this may also cause a total charge amount of the battery to be permanently limited, when at least one cell has a very higher charging voltage than other cells.

When one cell has a limiting value of the lowest charging voltage and another cell has a limiting value of the highest charging voltage, the battery may not be charged or discharged, although all other cells respectively have proper charging voltages.

In addition, even in a case where charging/discharging is repeated, imbalance between cell voltages occurs and thus the battery lifetime is shortened and an energy efficiency of the battery cell decreases.

Furthermore, when cell voltage imbalance occurs in a complete product, it is difficult to provide an after-sales service to each cell, which may lead to a costly exchange of the battery pack itself.

Thus, cell balancing is necessary for the battery pack, and there are typically two cell balancing schemes of a passive scheme and an active scheme.

In the passive scheme, a voltage difference with other cells is reduced by applying a high level cell voltage across a resistor to consume the voltage as heat energy.

In the active scheme, the entire cells are made to have a uniform value by moving a high level cell voltage to a cell having a low level voltage by using an element for storing energy such as an inductor or capacitor.

However, in the passive scheme, a time required to balance is relatively short, but the balancing is performed only in a direction of lowering the voltage of the battery. As time passes, an output of the battery is continuously reduced to shorten a charging cycle and an internal temperature of the battery pack is raised as heat energy is generated through a resistor.

In addition, the active scheme has a relatively long charging cycle than the passive scheme due to low energy consumption, but a voltage of one cell is moved to another cell, which results in a long cell balancing time.

Accordingly, it is required to develop a technology having a long charging cycle in the active scheme and capable of performing rapid cell balancing in the passive scheme.

PRIOR ART REFERENCES

Korean application publication No. 10-2014-0034089

DISCLOSURE OF THE INVENTION

Technical Problem

The present invention provides a cell balancing system and method capable of performing rapid cell balancing without consuming a battery voltage.

Technical Solution

A cell balancing system according to an embodiment of the present invention includes: a battery pack configured from two or more battery cells; a battery management system (BMS) for monitoring voltages of two or more battery cells during charging of the battery pack, and commanding to perform cell balancing for a battery cell, when a corresponding battery cell has a voltage difference equal to or greater than a prescribed value with other battery cells; a charging voltage switching unit for switching a pack charging voltage, which having charged the battery pack, to a cell balancing voltage for charging the battery cell and connecting the cell balancing voltage to the battery pack according to a cell balancing command from the BMS; and a cell switching unit for individually controlling to turn on/off a provision of the cell balancing voltage to each battery cell.

The charging voltage switching unit may include: a pack charging voltage source for converting an input voltage provided from external power to a pack charging voltage to output the pack charging voltage; a cell balancing voltage source for converting the input voltage provided from the external power to a cell balancing voltage to output the cell balancing voltage; a microcontroller unit (MCU) for controlling to release provision of the pack charging voltage for charging the battery pack to the battery pack and to switch to the cell balancing voltage to be provided according to the cell balancing command transmitted from the BMS; a circuit switching unit for switching a circuit according to a control by the MCU to provide the input voltage from an outside to the cell balancing voltage source; and a cell balancing voltage source for receiving the input voltage through the circuit switched by the circuit switching unit to provide the cell balancing voltage to a corresponding cell.

The charging voltage switching unit may control the circuit switching unit so as to charge the battery pack through the pack charging voltage source, when the cell balancing command is not transmitted from the BMS.

The circuit switching unit may be configured from a plurality of switches connected with the MCU and the converter.

Each of the cell switching unit may be configured from a first switch connected to an anode of the cell, the BMS, and the cell balancing voltage source, and a second switch connected to a cathode, the BMS and the ground.

A cell balancing method according to an embodiment of the present invention performs balancing of two or more battery cells configuring a battery pack. The method includes: a battery pack charging step for performing charging of the battery pack; a cell balance checking step for checking whether cell balancing is necessary due to occurrence of voltage imbalance in a battery cell of the battery pack being in charge in the battery pack charging step; a circuit switching step for switching a circuit so as to provide the cell balancing voltage to a corresponding battery cell to connect a power supply circuit, which has been connected to the pack charging voltage source, to the cell balancing voltage source, when it is checked that the cell balancing is necessary in the cell balance checking step; and a cell switch control step for turning on a cell switch of the corresponding cell so as to provide the cell balancing voltage input through the circuit switched in the circuit switching step to a cell requiring the cell balancing.

The cell balance checking step may include: a cell voltage measuring step for periodically measuring each voltage of the two or more battery cells; a voltage difference calculating step for calculating a voltage difference between cells by using the two or more battery cell voltages measured in the cell voltage measuring step; and a voltage difference comparing step for comparing the voltage difference between cells calculated in the voltage difference calculating step with a voltage difference in a preset prescribed range.

In the voltage difference comparing step, when the voltage difference between cells is greater than the voltage difference in the preset prescribed range, the circuit switching step may be performed.

In the circuit switching step, the switching may be performed by turning on a switch connected to the pack charging voltage source, and turning off a switch connected to the cell balancing voltage source.

In the cell switch control step, according to turn-on of a cell switch, a ground terminal of the cell switching unit and a ground terminal in the charging voltage switching unit may be electrically connected.

When it is determined that additional charging is necessary for the battery pack after cell balancing termination, a switch having been connected to the cell balancing voltage source may be turned off for performing cell balancing, and a switch having been connected to the pack charging voltage source may be turned on so as to connect a battery pack charging circuit with the power supplying circuit again.

When it is determined that battery charging is completed after cell balancing termination, a switch having been connected to the cell balancing voltage source may be turned off for cell balancing.

Advantageous Effects

A cell balancing system and method according to an embodiment of the present invention may have a switch formed in each cell to perform rapid and efficient cell balancing by providing a cell balancing voltage for charging a cell to a corresponding cell through the switch, when cell voltage imbalance occurs.

BRIEF DESCRIPTION OF THE DRAWINGS

FIG. 1 is a block diagram of a cell balancing system according to an embodiment of the present invention;

FIG. 2 is a block diagram of a cell switching unit in the cell balancing system according to an embodiment of the present invention;

FIG. 3 is a flowchart of a cell balancing method according to an embodiment of the present invention; and FIG. 4 is a flowchart of a cell balance checking step in the cell balancing method according to an embodiment of the present invention.

MODE FOR CARRYING OUT THE INVENTION

Hereinafter, embodiments of the present invention will be described in detail with reference to the accompanying drawings. However, the present invention is not restricted or limited by the embodiments. Rather, the embodiments are provided so that the disclosure of the present invention is thorough and complete and fully conveys the scope of the present invention to those skilled in the art.

The term "first", "second" or the like may be used for describing various elements but does not limit the elements. Such terms are only used for distinguishing one element from other elements. For example, without departing the scope of the present invention, a first element may be referred to as a second element, and likewise, a second element may be referred to as a first element. The terminology used herein is not for delimiting the present invention but for describing specific embodiments. The terms of a singular form may include plural forms unless otherwise specified.

The terms used herein have been selected from among general terms that are widely used at the present time in consideration of the functions of the present invention, but may be changed depending on intentions of those skilled in the art, judicial precedents, or the advent of new technology. Furthermore, specific terms have been arbitrarily selected by the applicant, and the meanings of such terms will be described in detail in relevant sections of the description. Therefore, it should be understood that the terms used herein should not be simply defined literally but should be defined on the basis of the meanings of the terms and the overall contents of the present invention.

1. A cell balancing system according to an embodiment of the present invention

A cell balancing system according to an embodiment of the present invention may have a switch formed in each cell to perform rapid and efficient cell balancing by receiving a cell balancing voltage through the switch and charging only the corresponding cell, when cell voltage imbalance occurs.

FIG. 1 is a block diagram of a cell balancing system according to an embodiment of the present invention.

Referring to FIG. 1, a cell balancing system 100 according to an embodiment of the present invention includes a battery pack formed of two or more battery cells, a battery management system (BMS) 110 for commanding to perform cell balancing on a corresponding cell, when voltages of the two or more battery cells are monitored during charging of the battery pack and there is a battery cell having a voltage difference equal to or greater than a prescribed value with other battery cells, a charging voltage switching unit 120 for switching, to a cell balancing voltage, a pack charging voltage having charged the battery pack according to a cell balancing command, and connecting the cell balancing voltage to the battery pack, and a cell switching unit 130 for individually turning on/off a supply of the cell balancing voltage to the cell.

Hereinafter, the charging voltage converting unit will be described in detail.

Referring to FIG. 1, the charging voltage switching unit 120 includes an input unit 121 for receiving an AC input power from the outside, as a charging voltage is supplied through two voltage sources that supply different voltages, a converter 122 for converting the AC input power from the input unit 121 to DC input power so as to be able to charge the battery pack, an micro-controller unit (MCU) 123 for commanding that a voltage of the DC input power from the converter 122 is to be delivered to one of the two voltage sources, and a circuit switching unit 124 connected to one of the two voltage sources according to the command from the MCU 123 and for delivering the voltage of the DC input power to a battery.

The two voltage sources are a pack charging voltage source 125 and the cell balancing voltage source 126, and the circuit switching unit 124 selectively applies external power input through the converter 122 to the pack charging voltage source 125 or the cell balancing voltage source 126 according to the command from the MCU 123.

Accordingly, when the cell balancing command is transmitted from the BMS 110, the MCU 123 commands that the input voltage from the outside is supplied to the cell balancing voltage source 126, and according to the command from the MCU 123, the circuit switching unit 124 switches to connect a circuit, which has been connected to the cell balancing voltage source 126, to the pack charging voltage source 125.

Through the circuit connected by the circuit switching unit 124, the cell balancing voltage source 126 provides the cell balancing voltage to a corresponding cell such that cell balancing is performed.

Here, when the cell balancing command is not transmitted from the BMS 110, the charging voltage switching unit 120 charges the battery pack by connecting the input voltage provided from the external power to the pack charging voltage source 125 to provide the pack charging voltage to the battery pack.

In addition, the converter 120 is electrically connected to the ground.

Furthermore, the cells of the battery pack are connected in parallel to raise the capacity of the battery pack and have a constant voltage.

Hereinafter, the configuration of the charging voltage converting unit 120 will be described in detail.

The two voltage sources mean a pack charging voltage source 125 for providing the pack charging voltage so as to charge the battery pack, and the cell balancing voltage source 126 for providing a cell balancing voltage such that a cell, which requires cell balancing, among multiple battery cells that configure the battery pack is charged.

Here the pack charging voltage is set to 16.8 V as an embodiment, but is not limited thereto.

In addition, the cell balancing voltage is set to 5 V as an embodiment, but is not limited thereto.

Moreover, the pack charging voltage source 125 and the cell balancing voltage source 126 respectively further include configurations for dropping the voltage of the DC input power to each proper output voltage.

Therefore, the pack charging voltage source 125 drops the input external power to a voltage necessary for charging the battery pack and outputs the voltage. To this end, the pack charging voltage source 125 may include a voltage drop circuit for receiving the external input voltage and dropping the external input voltage to the pack charging voltage.

In addition, the cell balancing voltage source 126 drops the input external power to a voltage necessary for balancing the battery cells and outputs the voltage. To this end, the cell balancing voltage source 126 may include a voltage drop circuit for receiving the external input voltage and dropping the external input voltage to the cell balancing voltage.

Furthermore, outputs of the pack charging voltage source 125 and the cell balancing voltage source 126 may be output to the battery pack or the plurality of battery cells through the voltage output unit 127.

In addition, the MCU 123 is controlled by the BMS 110 of the battery pack, and the MCU 123 and the BMS 110 communicates to each other. The communication may be performed by means of an internal communication scheme such as I2C, SMBus, CAN, UART and SPI, and commands may be transmitted thereby.

For example, when determining that cell balancing is necessary, the BMS 110 stops provision of the pack charging voltage to the MCU 123 and transmits a command for switching the pack charging voltage to the cell balancing voltage and providing the cell balancing voltage.

In addition, after completion of the cell balancing, when determining that a provision of an additional pack charging voltage is necessary, the BMS 110 transmits a command for stopping the provision of the cell balancing voltage and switching the cell balancing voltage to the pack charging voltage to provide the pack charging voltage.

Furthermore, the circuit switching unit 124 is configured from a plurality of switches connected to and controlled by the MCU 123 so as to connect or disconnect the converter 122 to or from the pack charging voltage source 125 or the cell balancing voltage source 126, and switches a circuit by turning on/off the switches.

For example, when receiving the cell balancing command from the MCU 123, a switch of a circuit, in which the pack charging voltage source 125 and the converter 122 are connected, is turned off and a switch for connecting the cell balancing voltage source 126 with the converter 122 is turned on such that a voltage of the DC charging voltage from the converter 122 is provided. Accordingly, in the cell balancing device of the present invention, if necessary, the cell balancing voltage is applied to the two or more battery cells by the cell balancing voltage source 126, and the pack charging voltage is applied to the battery pack by the pack charging voltage source 125, when the cell balancing is not necessary, but the battery pack is required to be charged.

In addition, a switch element of the circuit switching unit 124 may use a Metal Oxide Field Effect Transistor (MOSFET), a Bipolar Junction Transistor (BJT), or an Insulated Gate Bipolar Transistor (IGBT), etc.

The cell balancing voltage across the circuit switched by the circuit switching unit 124 is provided to a corresponding cell, which requires the cell balancing, through the cell switching unit 130. Detailed description about the cell switching unit 130 will be provided in relation to FIG. 2.

FIG. 2 is a block diagram of a cell switching unit in the cell balancing system according to an embodiment of the present invention.

Referring to FIG. 2, the cell switching unit 130 in the cell balancing system includes a first switch 131, a first end of which is connected to the BMS 110 and receives a signal, a second end of which is connected to a path of a voltage input from the cell balancing voltage source 126, and a third end of which is connected to an anode of the battery cell, and a second switch 132, a first end of which is connected to the BMS 110 and receives a signal, a second end of which is connected to the ground, and a third end of which is connected to a cathode of the battery cell.

In addition, when the cell balancing proceeds, as the second switch 132 is turned on by the signal from the BMS 110, a ground terminal of the cell switching unit 130 is electrically connected to a ground terminal in the charging voltage switching unit 120.

In this way, the cell switching unit 130 is provided in plurality so as to be allocated to each individual battery cell.

A driving method of the cell balancing system using this cell switching unit 130 will be described in detail below.

The cell balancing system 100 receives AC input power from the outside through the input unit 121, and the received AC input power is converted to DC input power by the converter 122. When voltage imbalance occurs in a cell of the battery pack being in charge through the pack charging voltage source 125, the BMS 110 checks cell balancing and transmits a cell balancing command to the MCU 123, when the cell balancing is necessary.

In addition, the BMS 110 outputs a cell balancing signal to the cell switching unit 130 of a cell that requires balancing.

The MCU 123 having received a cell balancing command from the BMS 110 switches a circuit through the circuit switching unit 124 and provides a voltage of the DC input power from the converter 122 to the cell balancing voltage source 126. Here, in the circuit switching unit 124, the switch connected to the pack charging voltage source 125 is turned off and the switch connected to the cell balancing voltage source 126 is turned on.

The cell switching unit 130 having received the cell balancing signal from the BMS 110 turns on a first switch 131 and a second switch 132 to allow the cell balancing voltage input from the cell balancing voltage source 126 to be provided. At this point, the first end of the second switch 132 is connected to the ground to which the converter 122 is connected.

In addition, when the cell balancing of the battery cell, which has been charged through the cell balancing voltage source 126, is completed, the BMS 110 determines whether to perform battery pack charging again or stop charging.

When determining that the battery pack charging is necessary, the BMS 110 transmits a battery pack charging resume command to the MCU 123, and outputs a cell balancing stop signal to the cell switching unit 130.

The MCU 130, which having received the battery pack charging resume command, controls the circuit switching unit 124 to switch a circuit, which has been connected to the cell balancing voltage source 126, to be connected to the pack charging voltage source 125 again. Here, the switch connected to the cell balancing voltage source 126 is turned off and the switch connected to the pack charging voltage source 125 is turned on.

In addition, the cell switching unit 130 having been received the cell balancing stop signal from the BMS 110 turns off the first and second switches 131 and 132. At this point, the connection of the second switch 132 to the ground is released.

On the other hand, when determining that the battery pack charging and cell balancing are completed and charging is to be stopped, the BMS 110 transmits a battery pack charging stop command to the MCU 130, and outputs a cell balancing stop signal to the cell switching unit 130.

In addition, the MCU 123 having received the charging stop command from the BMS 110 controls the circuit switching unit 124 to release connections with the pack charging voltage source 125 and the cell balancing voltage source 126. Here, the switch connected to the cell balancing voltage source 126 in the switching unit 124 is turned off.

As another driving method, there is a scheme for determining whether to perform cell balancing in real time. This scheme is disadvantageous in that it is required to measure a voltage and make determination in real time, which results in a complicated algorithm.

Accordingly, in the other driving method, the cell balancing is performed after the battery pack charging is completed.

When the battery pack charging is completed through the pack charging voltage source 125, the BMS 110 measures a voltage of each cell of the battery pack and compares the measured cell voltage with a preset prescribed voltage.

When cell balancing is necessary as a result of the voltage comparison, the BMS 110 transmits a cell balancing command to the MCU 123 and outputs a cell balancing signal to the cell switching unit 130.

The MCU 123 controls the cell switching unit 124 to switch a circuit, which has been connected to the pack charging voltage source 125, to be connected to the cell balancing voltage source 126. Here, in the circuit switching unit 124, the switch connected to the pack charging voltage source 125 is turned off and the switch connected to the cell balancing voltage source 126 is turned on.

In addition, the circuit connected to the cell balancing voltage source 126 is provided with the voltage of the DC input power from the converter 122.

Furthermore, the cell switching unit 130 having been received the cell balancing signal from the BMS 110 turns on the first and second switches 131 and 132 to allow the cell balancing voltage to be provided to a corresponding cell. At this point, the second switch 132 is connected to the ground to which the converter 122 is connected.

In addition, when cell balancing of a cell, which has been charged by the cell balancing voltage source 126, is completed, the BMS 110 transmits a battery pack charging stop command to the MCU 130, and outputs a cell balancing stop signal to the cell switching unit 130.

The MCU 123 having received the charging stop command from the BMS 110 controls the circuit switching unit 124 to release a circuit connection with the pack charging voltage source 125 and the cell balancing voltage source 126. Here, in the switching unit 124, the switch connected to the cell balancing voltage source 126 is turned off.

In addition, the cell switching unit 130 having applied the cell balancing stop signal from the BMS 110 turns off the first and second switches 131 and 132. At this point, the connection of the second switch 132 to the ground is released.

2. A method for providing a charging voltage according to an embodiment of the present invention A cell balancing method of the present invention is a method for performing cell balancing by switching a pack charging voltage, which having been provided to a circuit, to a cell balancing voltage and controlling a switch of a corresponding cell, which requires cell balancing, to provide the cell balancing voltage to the corresponding cell, when the cell balancing is necessary at the time of charging the battery pack.

FIG. 3 is a flowchart of a cell balancing method according to an embodiment of the present invention.

Referring to FIG. 3, the cell balancing method according to an embodiment of the present invention, first, charges a battery pack with an input voltage provided from external power (battery pack charging step S310), and, when voltage imbalance occurs in a battery cell of the battery pack being in charge, checks whether the corresponding cell requires cell balancing (cell balance checking step S320). When it is checked that the cell balancing is necessary in the cell balance checking step S220, a circuit is switched such that the cell balancing voltage is provided to the corresponding cell and a power supply circuit, which has been connected to the pack charging voltage source 125, is connected to the cell balancing voltage source 126 (circuit switching step S330). S330).

In addition, cell switches 131 and 132 of a cell, which requires cell balancing, are turned on such that the corresponding cell is provided with the cell balancing voltage that has been input through the switched circuit in the circuit switching step S330 (cell switch control step S340). At this point, the second switch 132 is connected to the ground to which the converter 122 is connected.

Here, the circuit switching method in the switch switching step S330 is performed by turning off a switch for connecting the converter 122 with the pack charging voltage source 125, and turning on a switch for connecting the converter 122 with the cell balancing voltage source 126.

In addition, the charging voltage for charging the battery pack is set to 16.8 V as an embodiment, but is not limited thereto.

In addition, the cell balancing voltage has the voltage magnitude used in the cell and set to 5 V as an embodiment, but is not limited thereto.

Furthermore, after termination of the cell balancing, the BMS determines whether additional charging for the battery pack is necessary or charging is to be stopped on the basis of a voltage of a cell for which cell balancing is completed.

When additional charging is necessary for the battery pack, the switch connected to the cell balancing voltage source 160 is turned off and the switch connected to the pack charging voltage source 150 is turned on, such that the circuit having been connected to perform the cell balancing is connected to the battery pack charging circuit again.

In addition, the first and second switches 131 and 132 of each battery cell having performed the cell balancing are turned off. At this point, the connection of the second switch 132 to the ground is released.

On the contrary, when charging of the battery pack is completed after the cell balancing termination, it is not necessary to proceed charging any more. Therefore, the switch connected to the cell balancing voltage source 160 is turned off, and the first and second switches 131 and 132 of each battery cell, which has performed the cell balancing, are also turned off. At this point, the connection of the second switch 132 to the ground is released.

On the other hand, the cell balance checking step S320 will be described in detail in relation to FIG. 4.

FIG. 4 is a flowchart of the cell balance checking step in the cell balancing method according to an embodiment of the present invention.

Referring to FIG. 4, each voltage of two or more battery cells is periodically measured (cell voltage measuring step S221), and a voltage difference between cells are calculated using the two or more battery cell voltages measured in the cell voltage measuring step S221 (voltage difference calculating step S222).

In addition, the voltage difference between cells calculated in the voltage difference calculating step S322 is compared with a voltage difference in a preset prescribed range (voltage difference comparing step S223).

When the voltage difference between cells is larger than the voltage difference in the preset prescribed range in the voltage difference comparing step S323, the circuit switching step S330 is performed.

Here, a period is arbitrarily set by a user within a range in which the interval between periods does not lower a charging efficiency of the battery pack.

In addition, a method for calculating a voltage difference is a method for subtracting a voltage value of each cell from a maximum value among voltage values measured for each cell.

Furthermore, the preset prescribed range of the voltage difference is set to a range in which efficient battery pack charging is possible with a prescribed cell balancing voltage, while a time for charging a cell, which requires cell balancing, is reduced.

As another embodiment, whether to perform the cell balancing is determined in real time. This scheme is disadvantageous in that it is necessary to measure a voltage and make determination in real time, which results in a complicated algorithm.

Accordingly, the other embodiment is a method for performing the cell balancing after the battery pack charging is completed.

First, the charging of the battery pack is completed using an input voltage provided from external power, and each voltage of two or more battery cells is measured.

In addition, each of the measured two or more battery cell voltages is compared with a preset prescribed voltage to determine that cell balancing is necessary for a cell of which measured cell voltage is smaller than the preset prescribed voltage value.

According to the determination of whether the cell balancing is necessary, circuit switching is performed such that a circuit connected to charge an existing battery pack is switched to a circuit for performing cell balancing, and the cell switching unit 130 controls to turn on the first and second switches 131 and 132 to allow a voltage to be provided from the circuit for performing the cell balancing. At this point, the second switch 132 is connected to the ground to which the converter 122 is connected.

Since charging of the battery pack is completed after the cell balancing termination, the switch of the circuit, which has been connected to the cell balancing voltage source 126 in order to perform cell balancing, is turned off, and the first and second switches 131 and 132 through which the cell balancing voltage has been provided are also turned off. At this point, the connection of the second switch 132 to the ground is released.

Although the technical concept of the present invention has been specifically described according to the above-mentioned embodiment, it should be noted that the above-mentioned embodiment is not for limiting the present invention but for describing the present invention. Furthermore, those skilled in the art can make various embodiments within the scope of the claims.

What is claimed is:

1. A cell balancing system comprising:
   a battery pack configured from two or more battery cells;
   a battery management system (BMS) for monitoring voltages of two or more battery cells during charging of the battery pack, and commanding to perform cell balancing for a battery cell, when a corresponding battery cell has a voltage difference equal to or greater than a prescribed value with other battery cells;
   a charging voltage switching unit for switching a pack charging voltage, which having charged the battery pack, to a cell balancing voltage for charging the battery cell and connecting the cell balancing voltage to the battery pack according to a cell balancing command from the BMS; and
   a cell switching unit for individually controlling to turn on/off a provision of the cell balancing voltage to each battery cell,
   wherein the charging voltage switching unit comprises:
   a pack charging voltage source for converting an input voltage provided from external power to a pack charging voltage to output the pack charging voltage;
   a cell balancing voltage source for converting the input voltage provided from the external power to a cell balancing voltage to output the cell balancing voltage;
   a microcontroller unit (MCU);

a circuit switching unit for switching a circuit according to a control by the MCU to provide the input voltage from an outside to the cell balancing voltage source; and a cell balancing voltage source for receiving the input voltage through the circuit switched by the circuit switching unit to provide the cell balancing voltage to a corresponding cell.

2. The cell balancing system of claim 1, wherein the MCU is configured to control to release a provision of the pack charging voltage for charging the battery pack to the battery pack and to switch to the cell balancing voltage to be provided according to the cell balancing command transmitted from the BMS.

3. The cell balancing system of claim 2, wherein the charging voltage switching unit controls the circuit switching unit so as to charge the battery pack through the pack charging voltage source, when the cell balancing command is not transmitted from the BMS.

4. The cell balancing system of claim 2, wherein the circuit switching unit is configured from a plurality of switches connected with the MCU and a converter.

5. The cell balancing system of claim 1, wherein the cell switching unit is configured from a first switch connected to an anode of the cell, the BMS, and the cell balancing voltage source, and a second switch connected to a cathode, the BMS and the ground.

6. A method for performing balancing of two or more battery cells, which configure a battery pack, the method comprising:
a battery pack charging step for performing charging of the battery pack;
a cell balance checking step for checking whether cell balancing is necessary due to occurrence of voltage imbalance in a battery cell of the battery pack being in charge in the battery pack charging step;
a circuit switching step for switching a circuit so as to provide a cell balancing voltage to a corresponding battery cell to connect a power supply circuit, which has been connected to the pack charging voltage source, to a cell balancing voltage source, when it is checked that the cell balancing is necessary in the cell balance checking step; and
a cell switch control step for turning on a cell switch of a corresponding cell so as to provide the cell balancing voltage input through the circuit switched in the circuit switching step to a cell requiring the cell balancing,
wherein the cell balance checking step comprises:
a cell voltage measuring step of periodically measuring each voltage of the two or more battery cells;
a voltage difference calculating step of calculating a voltage difference between cells by using the two or more battery cell voltages measured in the cell voltage measuring step; and
a voltage difference comparing step of comparing the voltage difference between cells calculated in the voltage difference calculating step with a voltage difference in a preset prescribed range.

7. The method of claim 6, wherein, in the voltage difference comparing step, when the voltage difference between cells is greater than the voltage difference in the preset prescribed range, the circuit switching step is performed.

8. The method of claim 6, wherein, in the circuit switching step, the switching is performed by turning on a first switch connected to the pack charging voltage source, and turning off a second switch connected to the cell balancing voltage source.

9. The method of claim 6, wherein, in the cell switch control step, according to turn-on of a cell switch, a ground terminal of a cell switching unit and a ground terminal in a charging voltage switching unit are electrically connected.

10. The method of claim 6, wherein, when it is determined that additional charging is necessary for the battery pack after cell balancing termination, a first switch having been connected to the cell balancing voltage source is turned off for performing cell balancing, and a second switch having been connected to the pack charging voltage source is turned on so as to connect a battery pack charging circuit with the power supply circuit again.

11. The method of claim 6, wherein, when it is determined that battery charging is completed after cell balancing termination, a first switch having been connected to the cell balancing voltage source is turned off for cell balancing.

* * * * *